Patented Jan. 17, 1950

2,494,537

UNITED STATES PATENT OFFICE 2,494,537

COLD-SETTING RESORCINOL GLUE COMPOSITION AND PROCESS OF PREPARATION

Glen E. Babcock and Allan K. Smith, Peoria, Ill., assignors to the United States of America as represented by the Secretary of Agriculture No Drawing. Application July 26, 1946,
Serial No. 686,278

3 Claims. (Cl. 260—7)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

Our invention relates to the method of making a glue composition and the product thereof. Our invention further relates to a cold-setting resin which will give a waterproof and moldproof glue line.

The object of our invention is to make an inexpensive adhesive composition capable of bonding wood, leather, phenolic plastics, and the like, at ordinary room temperature.

Another object of our invention is to make a glue composition which will cure, or set up, at room temperature and will be stable against water and molds.

The phenolic resin glues now in use give bonds that are extremely resistant to attack by molds and bacteria, and are waterproof. The phenolic resins, however, suffer from the disadvantage of requiring relatively high temperatures and pressures to effect a satisfactory bonded joint. In the "assembly" type of gluing wood, it is often impractical to combine the necessary heat and pressure in the operation, thus preventing the use of phenolic resin glues.

The recently developed resorcinol glues, prepared by combining formaldehyde with resorcinol, give waterproof and moldproof bonds by cold-setting methods. The resorcinol type glues are effective on a wide variety of materials, but they are relatively expensive. Other cold-setting resins, such as starch, gelatin, casein soybean meal, soybean protein, and urea resins, fail to give either a waterproof bond or a mold-resistant glue line. The term "waterproof glue" or "waterproof bond" is used to describe glued joints which may be exposed to high-moisture conditions, or soaked in water for a number of days, or boiled in water without seriously weakening the glued joint.

The importance of waterproof and moldproof glues is illustrated in the production of exterior grade plywood for prefabrication houses and in the building of planes and of boats.

The most commonly used resin glue now used for fabricating exterior type of construction is the phenolic resin glue. A properly prepared phenolic resin bond is known to be more enduring, under either dry or wet conditions, than ordinary wood. The phenolic resin glue, however, cannot be used in some types of construction, since the formation of the bond requires the simultaneous application of a high temperature and a high pressure. The required temperature and pressure are usually attained by placing the prepared flat panels between the steam-heated platens of a press. However, if the pieces to be glued have curved surfaces or odd shapes, or are of very large dimension, the gluing operation cannot be carried out in a flat press. Thus, for gluing curved surfaces and the like, a cold set glue is used advantageously.

Glues made from a combination of resorcinol and formaldehyde have the waterproof and mold-resistant properties of regular phenolic resin glues, and they also have the property of cold-setting or curing; the chief disadvantage of the resorcinol type of glue is in its relatively high cost. The object of the present invention is to prepare a waterproof, moldproof cold-setting glue from a combination of corn gluten, resorcinol, and formaldehyde at a lower cost than for resorcinol type glues now on the market.

The corn gluten used in the glue preparation is a byproduct of the manufacture of corn starch, and is a well-known article of commerce, although its principal use heretofore has been for the feeding of farm animals. The corn gluten employed may be that commonly prepared by centrifugal separation and containing 45 to 60 percent corn protein, or that containing 60 to 85 percent protein and known as destarched gluten, the starch having been removed or partly removed by treatment with enzymes or by acid hydrolysis. Corn gluten is further distinguished in its composition and properties by a low percentage of water-soluble constituents, such as sugars, and also by containing a substantial amount of protein which is soluble in alcohol. The partial solubility of the protein in alcohol is an important property of the corn gluten in the preparation of the glue described herein, since it is a factor in making the gluten compatible with the alcohol-soluble resin.

In the preparation of the resin, resorcinol is reacted with formaldehyde using an acid or a base as a catalyst. The reaction is very rapid and may be carried out at room temperature. In order to control the reaction and avoid a premature setting up of the resin, the amount of formaldehyde used in the first stage of the process is less than the amount required to complete the resin reaction. Subsequently, in the final stage of glue preparation, additional formaldehyde or a compound which will produce formaldehyde is added to complete the resin reaction and to accelerate the curing or setting up of the resin. The use of an acid catalyst is preferred, since it gives a resin of lower and more stable viscosity than a basic catalyst. In the first or incomplete stage of resin formation, the molar ratio of resorcinol to formaldehyde should exceed 5 to 4. A higher amount of formaldehyde produces a resin too viscous for practical application. In the final stage of glue preparation, additional formaldehyde or paraformaldehyde is added to give a final molar ratio of resorcinol to formaldehyde of less than about 9 to 10, and preferably about 9 to 12, that is, between about 1.1 to 2.5 mols of formaldehyde per mol of resorcinol.

When the resin is prepared with an acid catalyst, unlike the phenol formaldehyde resin, the reaction product is water-soluble. Also, since the acid polymerization gives a more uniform reaction product and is easier to control, we prefer this method of resin production, although either method gives a good resin. If more than 2 mols of resorcinol to one mol of formaldehyde is used, the resin contains unreacted resorcinol, and the reaction cannot go to completion. Such completion of reaction in the first stage of resin preparation is desirable.

We have found that other phenolic-like compounds can be partially substituted for the expensive resorcinol. Part of the resorcinol may be replaced with 3,5 xylenol, meta cresol, or phenol without any measurably weakening in the bond. The amount of these materials used to replace resorcinol should not exceed 40 percent. The replacement of larger amounts of resorcinol will cause a marked decrease in the curing rate of the resin. The following illustrates the preparation of a suitable resorcinol resin.

Two hundred and twenty parts of resorcinol are dissolved in 100 parts of 95 percent ethyl alcohol, 97 parts of U. S. P. Formalin are added, and the solution is mixed. Two grams of benzene sulfonic acid is added to catalyze the reaction which starts immediately with a rise in temperature and soon some refluxing of the solvent will occur. The reaction is then cooled to room temperature.

The pH of the resin is then adjusted to between about 7.1 and 7.7, preferably to 7.5 with aqueous sodium hydroxide. The pH measurement is made with a glass electrode after diluting the sample of resin with 25 parts of water. The resin prepared in the above proportions will have a total solids content of about 55 percent.

The glue is made by mixing various proportions of resin as prepared above with corn gluten in a conventional glue mixer. The following is an example of a glue that contains 60 percent resin and 40 percent corn gluten on a dry solids basis, plus the accelerator. The accelerator is paraformaldehyde or a formaldehyde liberating material. In calculations on the composition of the gluten the accelerator is not included. Other proportions of resin and gluten may be used, preferably in the range of 2 parts resin to 1 part gluten and equal parts of resin and gluten.

*Example*

50 parts resin solution prepared as above
18 parts corn gluten
5 parts paraformaldehyde
45 parts ethyl alcohol The resin and gluten are mixed together, followed by the addition of the alcohol and the paraformaldehyde, preferably in that order. The working life of the glue will be increased by keeping the mixture cool during its preparation. With the pH of the glue at 7.5 and at a temperature of 75° F., the glue will have a working life in excess of three hours.

The glue prepared in the example gave the following test results when use on $\frac{1}{16}$" birch veneer. The table also shows the time the veneers were held together with pressure clamps or clamp time.

*Table*

| Time in clamps | Dry shear [1] values | Shear values after soaking in water 24 hours | Shear values after boiling in water 3 hours |
|---|---|---|---|
| 6 | 493–93 | 420–100 | 418–100 |
| 8 | 470–98 | 497–100 | 395–100 |
| 10 | 543–100 | 450–100 | 434–100 |
| 12 | 503–100 | 488–100 | 440–100 |

[1] First value is shear in pounds per square inch and the second value is wood failure in percent.

Having thus described our invention, we claim:

1. A process for preparing a cold setting glue comprising reacting resorcinol with formaldehyde in the ratio of not more than two mols of resorcinol to one of formaldehyde and not less than five mols of resorcinol to four mols of formaldehyde, in the presence of an acid catalyst, adjusting the pH of the resin to between 7.1 and 7.7, with aqueous alkali, mixing the resin with corn gluten, in the range of one to two parts of resin to one part gluten, and with alcohol and formaldehyde, the formaldehyde added being sufficient to give a final ratio of formaldehyde to resorcinol of 1.1 to 2.5 mols formaldehyde to one mol of resorcinol.

2. The process described in claim 1 in which up to and no more than 40 percent of the resorcinol is replaced by a substance of the group consisting of phenol and its homologues.

3. The process described in claim 1, in which the corn gluten is destarched corn gluten.

GLEN E. BABCOCK.
ALLAN K. SMITH.

REFERENCES CITED

The following references are of record in the file of this patent:

UNITED STATES PATENTS

| Number | Name | Date |
|---|---|---|
| 2,038,113 | Irey | Apr. 21, 1936 |
| 2,264,732 | Weber | Dec. 2, 1941 |
| 2,385,374 | Rhodes | Sept. 25, 1945 |
| 2,414,415 | Rhodes | Jan. 14, 1947 |
| 2,443,197 | Rhodes | June 15, 1948 |